(12) United States Patent
Hori

(10) Patent No.: US 7,006,997 B2
(45) Date of Patent: Feb. 28, 2006

(54) METHOD AND PROGRAM FOR PREVENTING UNFAIR USE OF SOFTWARE

(76) Inventor: Kenta Hori, 23-9, Kobuchi 1-chome, Sagamihara-shi, Kanagawa-ken 229-0004 (JP)

( * ) Notice: Subject to any disclaimer, the term of this patent is extended or adjusted under 35 U.S.C. 154(b) by 733 days.

(21) Appl. No.: 10/008,917

(22) Filed: Dec. 3, 2001

(65) Prior Publication Data

US 2002/0069173 A1   Jun. 6, 2002

(30) Foreign Application Priority Data

Dec. 5, 2000   (JP) .............................. 2000-370630

(51) Int. Cl.
*H04L 9/00*   (2006.01)
(52) U.S. Cl. .......................... 705/57; 705/59
(58) Field of Classification Search ................. 705/51, 705/53, 55, 57–59; 713/159; 719/331; 709/246
See application file for complete search history.

(56) References Cited

U.S. PATENT DOCUMENTS

| | | | | |
|---|---|---|---|---|
| 5,418,954 A | * | 5/1995 | Petrus | 719/331 |
| 5,646,992 A | * | 7/1997 | Subler et al. | 705/53 |
| 5,987,134 A | * | 11/1999 | Shin et al. | 713/159 |
| 6,145,012 A | * | 11/2000 | Small | 709/246 |
| 6,343,280 B1 | * | 1/2002 | Clark | 705/55 |

FOREIGN PATENT DOCUMENTS

JP   408289070 A   *   8/1996
JP   2000236325 A   *   8/2000

OTHER PUBLICATIONS

"Securing the Web", Baker, Steven, UNIX Review, v15n3, p.: 23-31, Mar 1997.*

* cited by examiner

*Primary Examiner*—Salvatore Cangialosi
(74) *Attorney, Agent, or Firm*—Yoshihito Iizuka

(57) ABSTRACT

For user registration, feature of a file system of a computer of a particular user is extracted, and a licenser generates key data characteristic of the extracted feature and provides the key data to the particular user. At the time of installation of particular software to be protected or actual use (startup) of the software, the user's computer reads the current feature of its file system, and an authorization test is performed for determining whether or not to permit use of the software by the user's computer, on the basis of presence/absence of identity or similarity between a current feature of the file system and the feature of the file system initially evaluated at the time of the user registration. On the condition that it has been determined that the use of the software by the user's computer can be permitted, the key data is updated to match the current feature of the file system. There may be provided a plurality of determination gates at a plurality of locations within the software to perform the authorization test at the plurality of locations. In this case, the use of the software by the user's computer may be inhibited if the authorization test has made a negative determination at any one of the determination gates, so as to reliably forestall unfair alteration of the software.

14 Claims, 6 Drawing Sheets

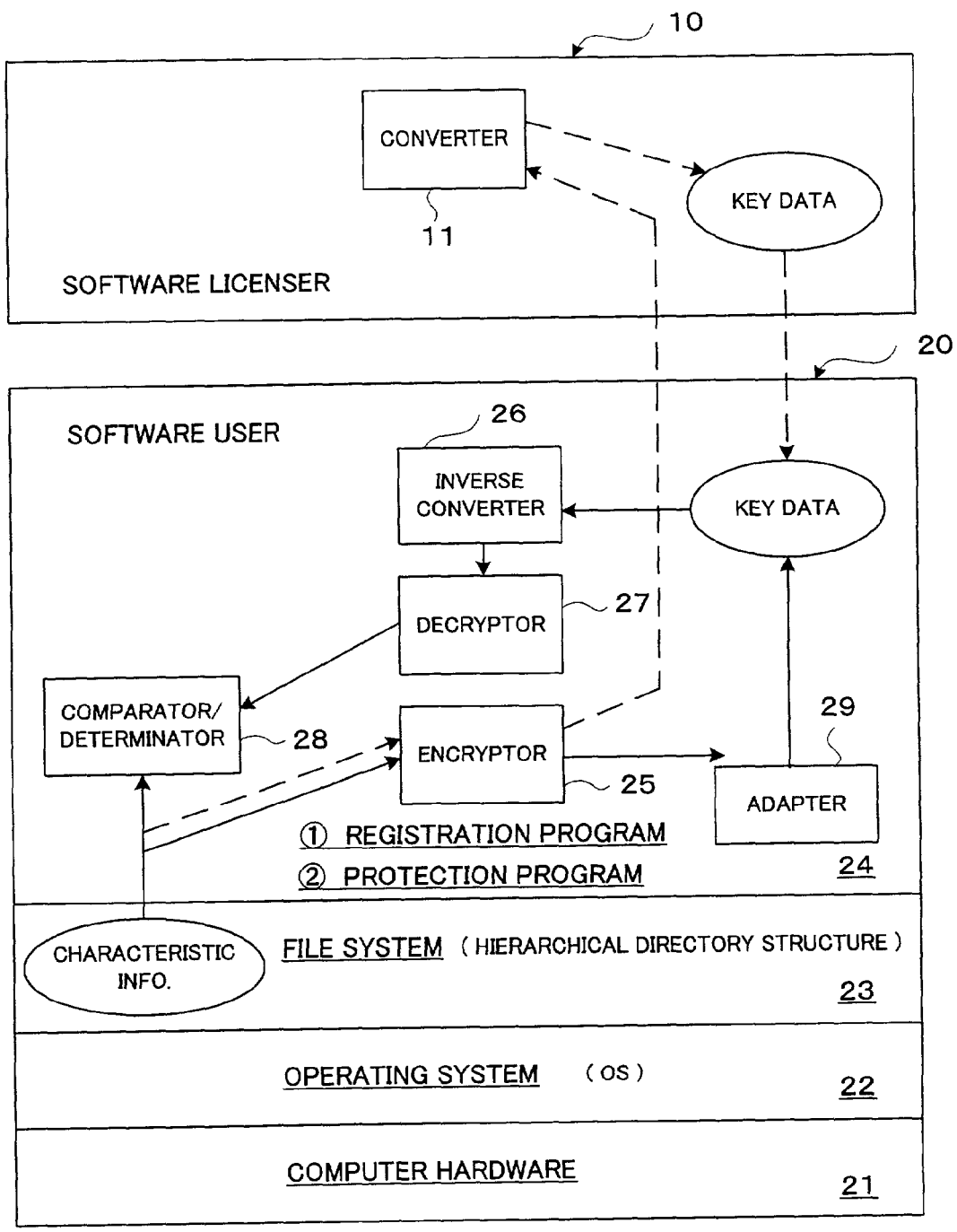
F I G. 1

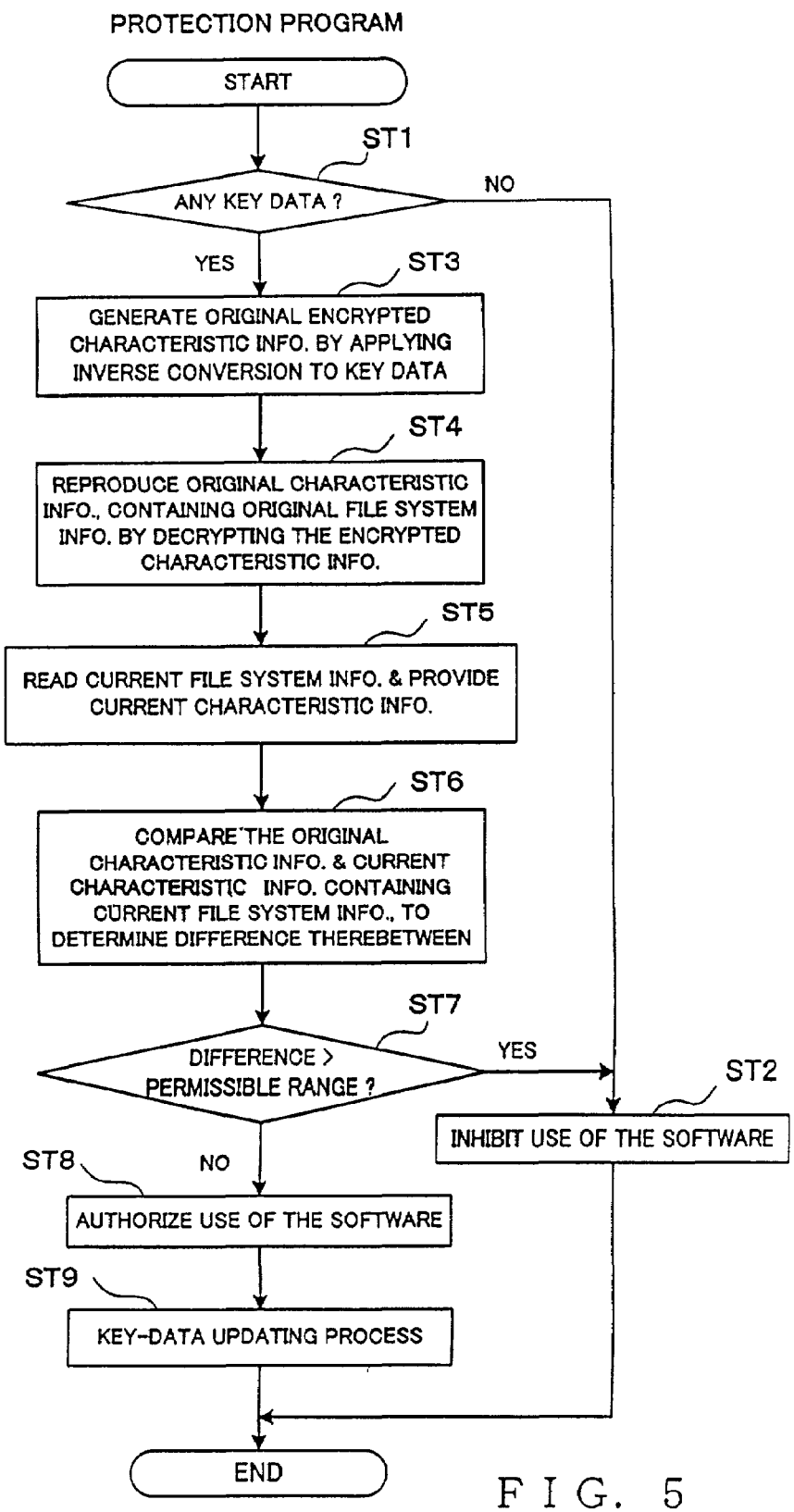
F I G. 5

METHOD AND PROGRAM FOR PREVENTING UNFAIR USE OF SOFTWARE

BACKGROUND OF THE INVENTION

The present invention relates to a method, computer program and system for preventing unfair or unauthorized use of software (or for protecting the copyright of the software). The present invention relates to a technique for inhibiting unfair or unauthorized use of software on an unregistered computer by using key data which is characteristic of or specific to a registered computer, and the present invention is effective, for example, for preventing unfair copying of software when installing the software into a computer, or for preventing unfair use of software after having been installed in a computer.

Among typical examples of the prior art techniques for preventing unfair use of software or unfair copying is a method based on use of a password. This prior art method permits an interested user to use or copy desired software, only when the interested user has entered a predetermined valid password acquired from a predetermined lincenser. However, this password-based method is incomplete as a means for preventing the unfair use of software, in that a user could easily tell his/her password to a potential unfair user and that the unfair user can use or copy the software by just entering the password whenever required. It is obvious that this method can not fully protect the copyright of software developers.

As another example of the prior art techniques, there is known a method based on use of a hardware key, which uses, as the key, hardware having particular information and is intended to more reliably ensure the copyright protection of software. This method permits a user to use or copy software on a computer, by determining whether the hardware key is connected with the computer. This method is suited for stronger or more reliable copyright protection than the above-mentioned password-based method, due to the difficulty encountered in copying hardware. But, because of its dependence on hardware, this hardware-key-based method would require relatively great costs and thus can be applied to only some expensive software. In addition, this method is not suited for recent software distribution in which supply, sale and purchase of software are readily performed on an online basis via a communication network such as the Internet.

As another example of the prior art techniques, there is known an unfair copy preventing method which uses a relatively inexpensive storage media to realize a protection function similar to that of the above-mentioned hardware-key-based method. In this media-based unfair copy preventing method, software is stored in a portable storage media, such as a floppy disk, and distributed in the form of such a portable storage media. Predetermined data is additionally written onto the storage media at the time of installation of the software; and it restricts the installation, from the next attempt of installation, based on the written data in the storage media. However, those techniques are not suited for the recent form for distributing software conveniently online via communication network, because they require some portable storage media for the distribution of the software. Further, those techniques have problems including that it is not applicable to those computers which do not possess some device for reading and writing on the certain storage media, and that new storage media is necessary even for a registered user to re-install the software.

As described above, those techniques which do not utilize characteristic information identifying a computer can not very effectively prevent the unfair copy of software onto unregistered computers. In other words, with those techniques, software could be easily and unfairly used or copied by using the same storage media, the same serial number, or the same password. Other prior art techniques utilize characteristic information of OS (the operating system) to prevent such easily practicable unfair copy described above. Those techniques require that the OS of a computer is supposed to store an unique ID of the computer in some manner, that the software has a key data which has information on an unique ID of a registered computer where the software is permitted to be used, and that the software compares the ID stored in the computer with the ID stored in the key data for authorizing the use of the software on the computer. Those prior art techniques can protect software more effectively than the weaker techniques described earlier, but they are costly in that a different programs must be developed for different OS(s). In addition, they can not be directly applied to preventing the unfair use or unfair copying of a growing number of "cross platform" software, such as many programs written in Java programming language, which, by its definition, can be executed on different OS(s) without being modified.

SUMMARY OF THE INVENTION

The present invention is invented to solve various prior art problems and inadequacies discussed above. It is intended to provide a method, computer program, and system for preventing unfair use of software or unfair copying, by mere software processing, without depending on hardware keys or portable storage media, and without being restricted by the nature of an OS used.

In order to accomplish the above-mentioned object, the present invention provides a method for preventing unfair use of software, which comprises: a first step of detecting a feature of a file system of a computer of a particular user and generating characteristic information based on the detected feature; a second step of allowing a licenser of software to generate key data on the basis of the characteristic information generated by the first step, and providing the user with the key data; a third step of detecting a feature of a file system of a particular computer when the software is to be used on the particular computer, and generating characteristic information on the basis of the feature detected by the third step; a fourth step of performing an authorization test for determining whether or not to permit use of the software by the particular computer (i.e., whether or not the particular computer can be authorized to use the software), on the basis of presence/absence of identity or similarity between the characteristic information based on the file system corresponding to the key data and the characteristic information generated by the third step; a fifth step of storing the key data provided to the user by said second step; and a sixth step of updating the key data, stored by said step of storing, so as to match the characteristic information generated by said third step, at least with the provision that said fourth step has determined the use of the software should be permitted.

For an example, the method includes a step for reproducing the characteristic information from the key data provided to the user, and in the fourth step, the reproduced characteristic information and characteristic information generated in the third step are compared, and the use of the software is authorized based on the identity or similarity of those information.

According to another aspect of the present invention, there is provides a computer program for causing a computer to perform a method for preventing unfair use of computer software, which comprises: a first step of detecting a feature of a file system of a computer of a particular user and outputting characteristic information based on the detected feature, the characteristic information based on the detected feature being sent to a licenser of the software so that the licenser is allowed to generate key data corresponding to the characteristic information; a second step of receiving the key data generated by the licenser; a third step of detecting a feature of a file system of a particular computer when the software is to be used on the particular computer, and generating characteristic information on the basis of the detected feature; and a fourth step of performing an authorization test for determining whether or not to permit use of the software by the particular computer (i.e., whether or not the particular computer can be authorized to use the software), on the basis of presence/absence of identity or similarity between the characteristic information based on the file system corresponding to the key data and the characteristic information generated by the third step.

The present invention may be constructed and implemented not only as the method invention as discussed above but also as an apparatus invention. Also, the present invention may be arranged and implemented as a software program for execution by a processor such as a computer or DSP, as well as a storage medium storing such a program. Further, the processor used in the present invention may comprise a dedicated processor with dedicated logic built in hardware, not to mention a computer or other general-purpose type processor capable of running a desired software program.

While the embodiments to be described herein represent the preferred form of the present invention, it is to be understood that various modifications will occur to those skilled in the art without departing from the spirit of the invention. The scope of the present invention is therefore to be determined solely by the appended claims.

BRIEF DESCRIPTION OF THE DRAWINGS

FIG. 1 is a functional block diagram illustrates the basic principles of the method for preventing unfair use of software in accordance with the present invention;

FIG. 5 is a flowchart showing an example of a protection program according to the method of the invention for preventing unfair use.

DETAILED DESCRIPTION OF EMBODIMENTS

Figure 2:
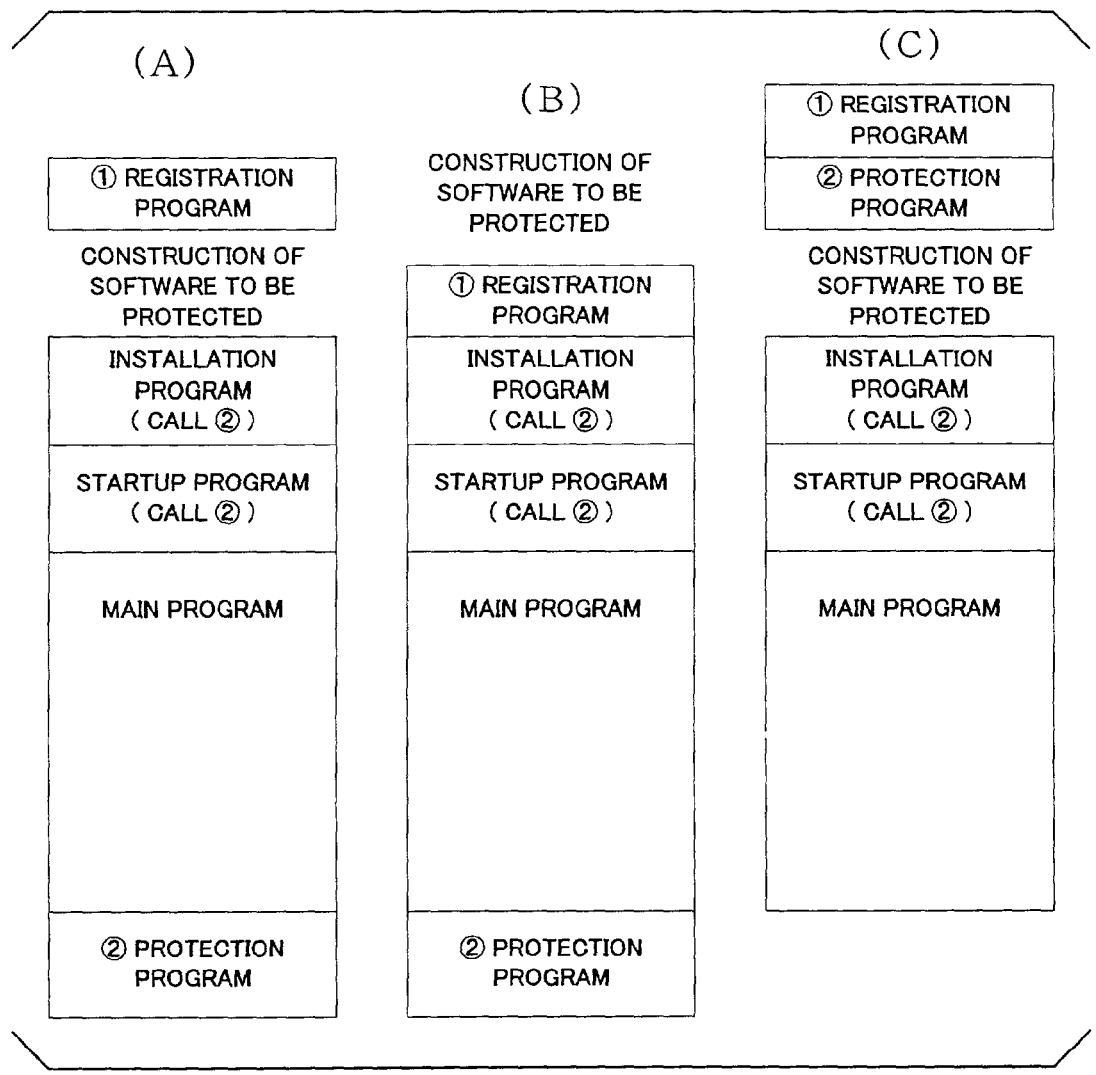
FIG. 2 is a schematic diagram showing exemplary construction of programs for implementing the method of the invention for preventing unfair use of software, and exemplary construction of software to be protected from the unfair use.

The general principles of the method of the present invention are first outlined. First, as a preparation for issuing an unique key data to a particular user, detection is made of features of the file system of a computer of the user, and characteristic information based on the detected features is created (first step). The term "user" as used herein indicates, for example, someone or some organization who duly or legally purchased software or explicitly indicated its intention to purchase the software. The features of the file system of the user's computer can be detected, for example, by reading information on the file system of the computer. The information on the file system (file system information) may be regarded as a so-called "fingerprint" which is characteristic of or unique to each computer. In other words, the file system of a computer of a particular user can be used as the characteristic information of the computer, since it faithfully reflects the unique history of use of the computer. This first step can be performed by mere software processing for detecting the features of the file system of the computer (for example, by reading the file system information of the computer), and it can eliminate need for hardware keys or portable storage media.

The characteristic information, based on the file system information, read from the user's computer is sent to a licenser of the software in question via a communication network or by other means. On the licenser's side, key data characteristic of the user's computer is generated based on the characteristic information which is in turn based on the features of the file system of the user's computer(second step). For example, such key data is generated by converting the characteristic information which based on the features of the file system of the user's computer, by use of a predetermined encryption algorithm. The thus-generated key data is provided to the user via the communication network or by any other possible means. In this way, with the issuance of such key data to the user by the licenser, the user is authorized to use the software (i.e. predetermined user registration is completed).

On the user's side, the features of the file system of a particular computer on which the software is to be used, and characteristic information is generated based on the detected features of the file system (third step). The detection of the features of the file system can be performed, for example, by reading the information on the file system of the computer. Throughout the following description, the characteristic information based on the thus-read file system information is called "current file system information". The term "current" as used herein does not necessarily mean a current time point in the strict sense, and the "current" file system information may be file system information read at any suitable time point slightly before the current time point, as long as the time point is after the generation of the above-mentioned key data. Note that, if the software is going to be fairly used by the user, the particular computer should be identical to the computer whose file system information was used originally for the generation of the key data at the time of the user registration.

On the user's side, the use of the software is authorized based on presence/absence of the identity or similarity of two characteristic information; the characteristic information of the file system corresponding to the key data, and the characteristic information generated in the third step, i.e. the "current" file system information (fourth step). The fourth step may include a step of, on the user's side, reproducing the characteristic information based on the file system from the key data provided by the licenser. The reproduction can be performed, for example, by the inverse conversion of the encryption algorithm mentioned above. In that case, the use of the software is authorized, in the forth step, based on the identity or similarity of two characteristic information: the reproduced characteristic information, and characteristic information generated in the third step. An alternative way to authorize the use of the software is to convert the characteristic information generated in the third step (i.e. "current" file system information) into key data, and compare the key data with the provided key data described above. The point is that the authorization of the use of the software is based on the features of the file system. Further, on the user's side, the key data provided from the licenser may be stored in memory in the user's computer, and the characteristic information based on the file system information may be reproduced from the stored key data. However, the key data need not necessarily be stored on the user's side. For example, the licenser may send the key data to the user on demand.

If, for example, there has been no change in the file system information of the user's computer since the generation of the key data (i.e. since the user registration), the both file system information are identical. This means that the user's current computer, i.e., the particular computer, is evidently identical to the computer whose file system information was used originally for the generation of the key data at the time of the user registration. Therefore, the use of the software on the computer is naturally authorized or permitted in this case. Such exact matching between the file system information can occur, for example, when the fourth step is performed immediately after the user registration. Of course, the content of the file system information changes as the user's computer is used. In such a case, the file system information reproduced from the key data becomes different from the current file system information detected in the third step described above. But if the difference falls within the permissible range, they are judged to be the file system information of the same computer, and the use of the software is authorized. On the other hand, if the software is to be used on another computer than the authorized one (i.e. the computer whose file system information was used originally for the generation of the key data), the file system information becomes significantly different from the one reproduced from the key data. Thus, they are judged, in the fourth step, as presenting no identity or similarity (i.e. to be outside the permissible range), and the use of the software is inhibited (i.e., not authorized).

With this invention, as set fourth above, the file system information of a computer of a particular user is utilized as characteristic information of the computer, and key data characteristic of the computer is generated based on the file system information, and authorization of the use of the software is performed by evaluating, by using the key data, the "current" file system information of the computer on which the software is to be used. Therefore the present invention achieves superior advantageous results as follows. Namely, the present invention can prevent unfair use of software with mere software processing, and is suitable for use in protecting software which is distributed on-line. Further, the invention can eliminate needs for hardware keys and distributing software in the form of a special kind of portable storage media. The present invention also achieves reduction in necessary costs, and does not require provision or creation of different software for different operating systems. Furthermore, the present invention can be applied to the "cross-platform" type of software, because it is free of restrictions by the operating system used.

The "use of software" in the context of the present invention include various forms of usage; for example, ① installing the software into a computer, ② starting up installed software on the computer and executing the program, ③ copying the software on the computer, etc. Therefore, it suffices to perform the authorization test in the above-mentioned fourth step, for example, ① when installing the software into the computer, ② when starting up the software on the computer (i.e. executing the program of the software), or ③ when copying the software. If it is determined that the use of the software should not be authorized, the use of the software is prohibited; in other words, ① the installation processing is ceased, ② the execution of the software is inhibited, or ③ the copying of the software is inhibited. In normal cases, it suffices to inhibit the ① installation operation or inhibit the ② execution of the software, because the unfair use of the software can be thus prevented even if the software is unfairly copyable. Of course, only inhibiting the copying or duplication of the software can be effective for preventing the unfair use of the software. The point is that the authorization in the fourth step, whenever it is performed, can accomplish the unique advantageous results of the present invention in preventing the unfair use of software, although the effectiveness of the prevention may differ. Further, the authorization in the fourth step may be performed at one or multiple points or locations within the software (or one or multiple time points during the execution of the software), as necessary. By doing so, even if an unauthorized user modifies the software to invalidate the authorization test function at one point or location within the software (e.g. the authorization test at the time of installing the software), the unfair use could be identified and inhibited at another point or location within the software.

Further, the comparison between the file system information may be performed in any suitable one of a variety of schemes. As one example of such comparison schemes, individual files are compared for similarity/dissimilarity, and a determination is made about degree of the similarity in the file system information as a whole. One possible approach for measuring such similarity/dissimilarity is to calculate a difference or a function which numerically expresses how different two file system information are, and then perform the authorization test on the use of the software depending on the calculated difference or the value of the above function. An alternative approach is to judge the similarity of the two file system information by using the known pattern recognition scheme.

Note that even in the case of a computer authorized by the licenser of the software, the file system information of the computer will change as the use of the computer is repeated. Therefore, in the event that the same key data is repeatedly used, the difference between the file system information reproduced from the key data (i.e. the file system information used at the time of the user registration) and the current file system information will ultimately become so big to fall outside the permissible range, so that the two file system information may be determined as dissimilar to each other. This problem can be solved by updating, as appropriate, the content of the key data so that it duly matches with the current file system information. Namely, as one example solution to the problem, the key data may be stored in the user's computer, and then the authorization test may be performed in the above fourth step using the thus-stored key data (e.g. by reproducing the file system information from the key data, and then comparing the reproduced file system information with the "current" file system information). Then, an additional step may be performed to update the content of the stored key data so that it matches with the "current" file system information detected in the above third step, at least on the condition that the use of the software is authorized in the above fourth step. The reason for updating the key data at least on the condition that the use of the software is authorized in the above fourth step is to permit updating the content of the key data, only when the duly authorized use of the software has been confirmed. If desirable, other conditions may be added for the updating of the content of key data. For example, although it is most preferable to perform the key data updating operation every time the use of the software is authorized in the fourth step, the key data updating may also be performed at appropriate time intervals.

In the following paragraphs, a preferred embodiment of the present invention is described in details, using attached figures.

FIG. 1 is a simplified block diagram explaining the basic principles of the method of the present invention for preventing unfair use of software, where block 10 indicates the computer system on the side of a licenser (i.e. a provider of the software license), and block 20 indicates the computer system on the side of a user of the software ("user" in the following).

The user's computer system 20, as well known in the art, includes computer hardware 21, an operation system ("OS" in the following) 22 functioning on the computer hardware 21, and a variety of "files", such as program files and data files, stored in the computer's storage device to together organize the file system 23 of the computer. This file system 23 constitutes a hierarchical directory structure, as conventionally known. The licenser's computer system 10 is constructed in a similar manner to the user's computer system 20, but detailed illustration of the computer system 10 is omitted here because it does not constitute an important part of the invention.

In FIG. 1, block 24 in the user's computer system 20 is the part of the program implementing the method of the present invention for preventing unfair use of software, which conceptually shows, in functional blocks, the processing carried out by the program. As an example, the program implementing the method of the present invention for preventing unfair use of software contains, for example, ① registration program and ② protection program. In FIG. 1, the dotted-line arrows indicate a processing flow pertaining to registration based on the registration program ①, and the solid-line arrows indicate a processing flow pertaining to software use based on the protection program ②. The registration program ① and the protection program ② may be built as a single program, although they are supposed to be separate programs in the following example.

FIG. 2 is a simplified illustration indicating, in connection with the registration program ① and the protection program ②, an example of the structure of the software to be protected from the unfair use, in accordance with a preferred embodiment of the present invention. (A) in FIG. 2 indicates an example of the registration program ① provided separately from the software to be protected. In such a case, the licenser of the software provides, in advance, the registration program ① to the user who wishes to legally gain the license for the using the software (e.g. by purchasing the software). The software to be protected is provided to the user after completion of a predetermined user registration procedure as will be described later. The software to be protected ("the software" in the following) contains a "main program" which is the main body of the software, an "installation program" which is executed when installing the software into the computer, and a "startup program" which is executed when starting the installed software, and the software is accompanied by the protection program ②. This protection program ② is called by at least one of the "installation program" and the "startup program", so that the processing for preventing the unfair use of software in accordance with the present invention is carried out during at least one of the installation and startup operations. Alternatively, as described later, the processing for preventing the unfair use of software in accordance with the present invention may be executed by calling the protection program ② at one or more points within the software to be protected.

Further, (B) in FIG. 2 indicates an example where the software to be protected contains not only the protection program ① but also the registration program ①. In this case, the software is provided before completion of the predetermined user registration procedure described later; however, the provision of the software prior to the completion of the user registration procedure will not present any particular problem because the use of the software is inhibited until the predetermined user registration procedure is completed.

(C) in FIG. 2 indicates an example where only the registration program ① and the protection program ② are first provided to the user and then the software is provided to the user after the completion of the predetermined user registration procedure. The following explanation will be made on the assumption that the registration program is first provided to the user and then the software accompanied by the protection program ② is provided to the user after completion of the predetermined user registration procedure as with the example of (A). Note that the licenser can provide these programs or the software to the user online via a communication network.

Figure 3:
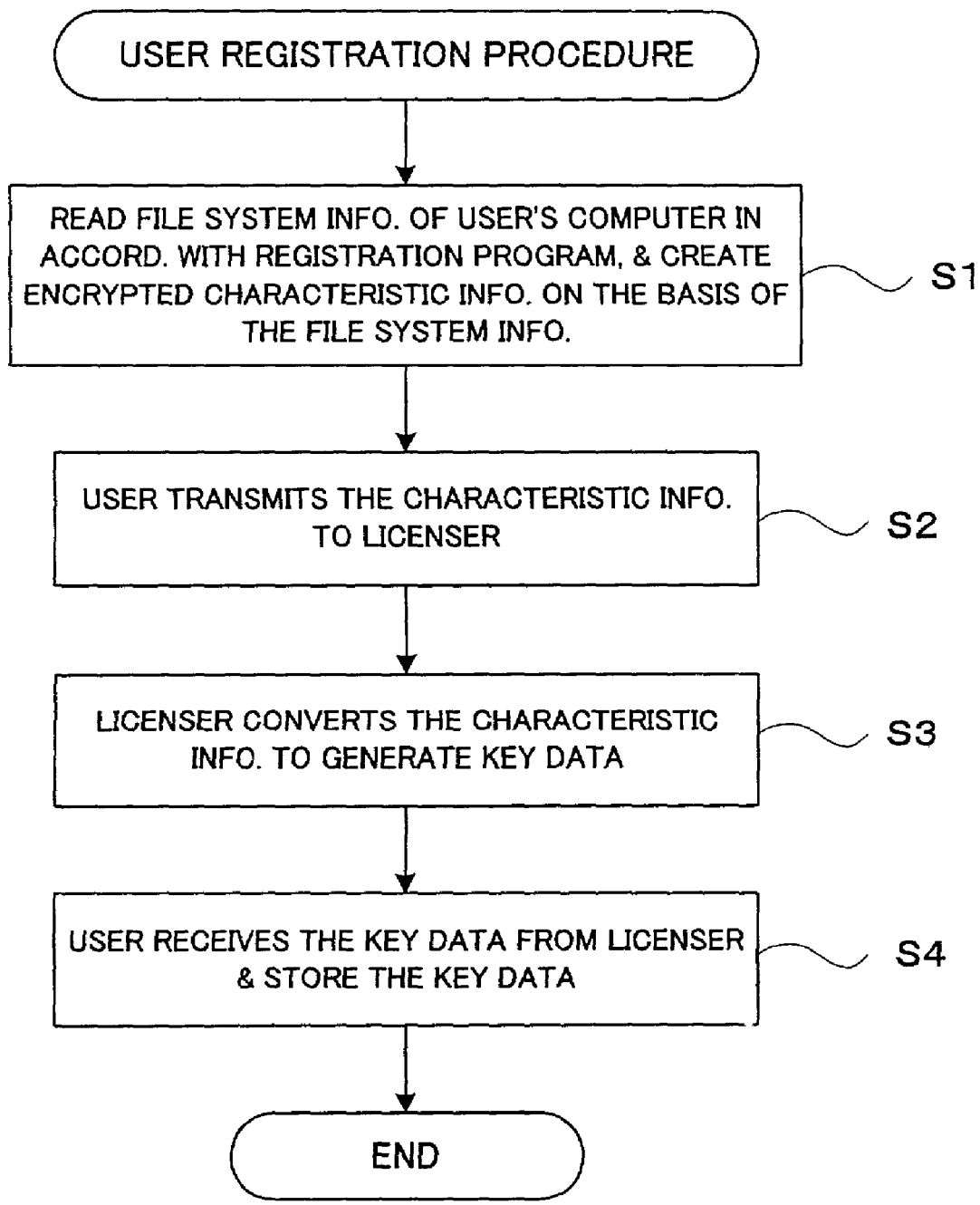
FIG. 3 is a flowchart of showing an example of user registration procedure according to the method of the invention for preventing unfair use of software.

FIG. 3 is a flowchart schematically showing the user registration procedure for using the software, i.e. the first stage of the method for preventing the unfair use in accordance with the present invention. This registration procedure is started up by starting the above registration program having been provided from the licenser to the user. Steps S1, S2, and S4 of FIG. 3 correspond to the main processing executed by the above-mentioned registration program ① on the user's computer. Operation in step S3 is performed on the licenser's computer. In this registration program, the file system information of the user's computer is read out, and encrypted using a predetermined encryption algorithm defined in the registration program, so as to generate encrypted characteristic information based on the encryption (step S1). Block 25 of encryptor in FIG. 1 conceptually indicates this encryption process. Any encryption algorithm may be used for the encryption purposes.

Figure 4:
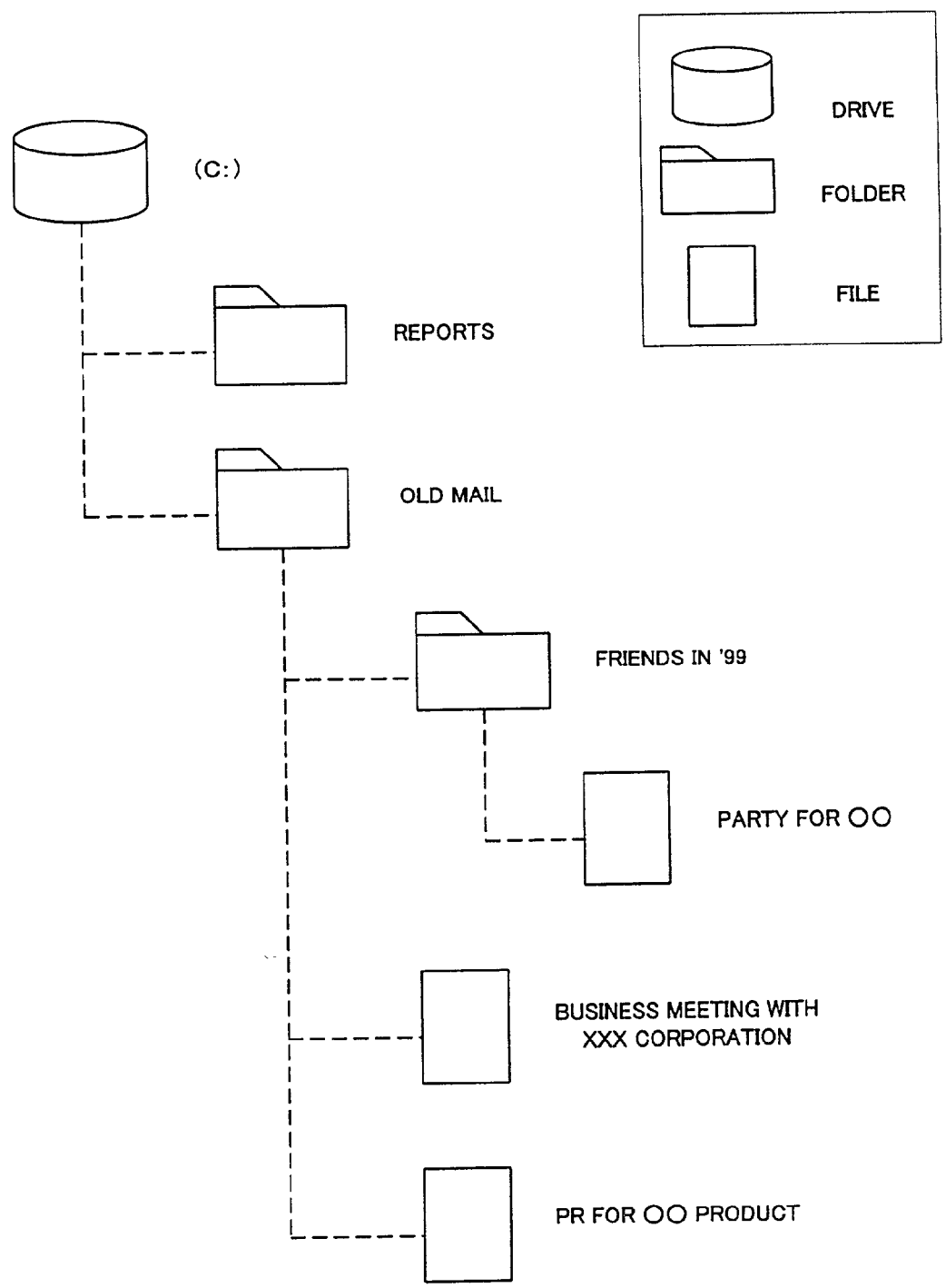
FIG. 4 is a diagram showing an example of a file system.

As well known, the terms "file system" of a computer mean a hierarchical directory structure of files; it indicates how files are located (or organized) in a computer. To detect the features of the file system, the existing operating system's function for reading file system information can be utilized; for example, the program called "Explorer" (trademark of Microsoft Corporation) of Windows (trademark of Microsoft Corporation) has functionality both to read the information of the file system and to visually display the hierarchical structure of the file system. Further, since we can utilize the file I/O functionality of a programming language to read the structure of the file system, the file system information can be acquired using such file I/O functionality. FIG. 4 is a schematic illustration of an example of the file system. There are a folder named "old mails" and other folders in the C drive, and a variety of files, such as a file named "Business meeting with XXX Corporation", are stored in those folders. As seen from this illustrated example, as a user uses his or her computer repeatedly, the file system of the computer becomes more and more characteristic of (unique to) the computer, as long as it is used in an ordinary manner at home or in office, because the computer is used in a manner characteristic of or specific to the user. In other words, the file system information of each computer may be regarded as information characteristic of or unique to the computer, except under special circumstances such as those immediately after installation of the OS into the computer. Therefore, the file system information of each computer can be utilized as the characteristic information of that computer, and thus computer-specific key data can be generated on the basis of such file system information as will be described later.

The characteristic information encrypted in step S1 may contain information other than the file system information (e.g. other information describing some aspects of the instant computer system). In short, it is necessary that the characteristic information should contain at least the file system information. Further, the encrypted characteristic information may be generated using only a part of the file system information (e.g. a part of the file system information describing only predetermined one or more, but not all, of the drives used, or only predetermined one or more, but not all, of the folders) rather than the whole of the file system information of the user's computer, and the method using such encrypted characteristic information also falls within the scope of the present invention. Note that the encryption process in step S1 is directed to making the key data difficult to decrypt in case any unfair or unauthorized user attempts to decode the key data. Therefore, the encryption procedure in step S1 can be dispensed with under some circumstances.

At next step S2, the encrypted characteristic information generated on the basis of the file system information is sent from the user to the licenser. Although it is desirable to send the characteristic information online via a communication network, the characteristic information may be sent on an off line basis using some portable storage media.

When the encrypted characteristic information has been received from the user, the licenser's computer system generates key data (data which functions as a key when authorizing valid use of the software) by converting the received encrypted characteristic information according to a predetermined conversion algorithm (step S3). It is desirable that the above conversion algorithm be an encryption algorithm, because such an encryption algorithm can make it difficult for any unfair user to decode and interpret the key data. Block "converter" 11 in FIG. 1 conceptually shows the conversion process. In this way, the key data is generated based on the file system information which is characteristic of the user's computer. This key data is sent from the licenser to the user, and is saved in the user's computer (step S4). Although it is desirable to send the key data, as well as the characteristic information, online via communication network, the key data may be sent offline via a portable storage media. Of course, the key data need not necessarily be saved electronically in the user's computer; instead, the user may take notes or remember the key data informed by the licenser, and enter the key data whenever the key data is required.

In this way, the procedure for the user registration is completed when the user has received the key data from the licenser. The software to be protected is provided to the user by the licenser at any appropriate time before or after the user registration procedure. Although it is desirable to provide the software (i.e. the software to be protected) online via the communication network, the software may also be provided offline via portable storage media.

Next, a description will be made about exemplary operation of the protection program ②, which corresponds to the second stage of the method of the invention for preventing the unfair use of software, with reference to the functional flow chart of FIG. 5. This protection program is executed on the user's computer, when the user installs the software to be protected into his or her computer, or when the user starts up the installed software. When the protection program is to be executed at the time of the installation, the protection program is called and executed during execution of the installation program for the software, and then the installation is permitted if it is determined that the software can be used fairly by the user, i.e. that the user is an authorized user of the software. On the other hand, when the protection program is to be executed at the startup of the installed software (i.e., at the beginning of execution of the installed software), the protection program is called and executed during execution of the startup routine of the software, and then the use of the software is permitted if it is determined that the software can be used fairly by the user, i.e. that the user is an authorized user of the software. This protection program may be executed both at the time of installation of the software and at the time of startup of the software, rather than either at the time of installation or at the time of startup. Alternatively, the protection program may be executed at any one or more points within the software.

Once the protection program is started, a search is first made for key data (step ST1). The search for the key data may be made using any suitable method such as: the method to find key data at a certain file location which the user has specified on a dialog screen displayed on the computer display in accordance with the protection program; the method to find key data by searching through a certain directory which was specified in advance in some way; and the method to find the key data by searching through the entire storage space of the computer. If it has been judged in step ST1 that the key data does not exist, the use of the software is not permitted (step ST2).

If the existence of the key data has been confirmed in step ST1, the original encrypted characteristic information is generated by applying the inverse conversion to the key data (step ST3). Block 26 of the inverse converter in FIG. 1 conceptually shows this inverse conversion processing in step ST3. The inverse conversion algorithm used in this inverse converter 26 is the inverse of the conversion algorithm used in the conversion processing (step S3 in FIG. 3 or converter 11 in FIG. 1) at the time of the above user registration procedure on the licenser's side, and reproduces, from the key data, the original encrypted characteristic information before the conversion.

Next, the characteristic information containing the original file system information is reproduced by decrypting (or decoding) the encrypted characteristic information reproduced in the above step ST3 (step ST4). Block 27 of the decryptor in FIG. 1 conceptually shows this decrypting processing in step ST4. The decryption algorithm used in the decryptor 27 is the inverse of the encryption algorithm used in the encryptor (step S1 in FIG. 3 or encryptor 25 in the FIG. 1) at the time of the above user registration procedure, and it reproduces the characteristic information containing the original file system information by decrypting the encrypted characteristic information.

On the other hand, the "current" file system information of the user's computer is read at any desirable time point, and the thus-read "current" file system information is used to provide the "current" characteristic information of the user's computer (step ST5). This processing of step ST5 may be performed before any one of step ST1, ST3 and ST4. Alternatively, the "current" file system information of the user's computer may be read and stored in memory in advance at some earlier time point, and then the thus-stored "current" file system information may be read out in this step ST5. As described above, the file system information can be acquired by using the file I/O functions of programming languages. In addition, the "current" characteristic information, reproduced in this step ST5, of the user's computer may contain other information than the file system information; in short, it is only necessary that the "current" characteristic information contain at least the file system information. Further, the characteristic information may be generated using only a part, rather than the whole, of the file system information However, the generated characteristic information must be the same kind of information as the characteristic information (or the "original" characteristic information) used for the generation of the key data at the above user registration procedure.

Next, the "original" characteristic information (or the "original" file system information) acquired in step ST4 is compared with the "current" characteristic information (or the "current" file system information), and the difference between the two compared information is determined (step ST6). This difference may be calculated either as a numerical value or as a vector. For example, the difference can be calculated by comparing the set of files in the file system acquired from the "original" characteristic information and the set of files in the "current" file system, using the following formula;

$$C=B \div (A+B),$$

where C is the calculated difference, A is the number of the files contained in the both "original" and "current" file system, and B is the number of files contained in only either one of those file systems. According to this difference calculation metod, the difference C takes the minimum value of 0 when the two file systems are exactly identical to each other, because B equals "0". The difference C increases in value as B, the number of the files contained in only either one of the two file system, increases, and C takes the maximum value of "1" when the two file systems have no file in common (i.e. when A equals "0"). In short, the difference C takes a decimal value between 0 and 1, and the identity or similarity increases as the difference decreases.

Next it is determined whether or not the difference C, i.e. the result of comparison, is within a certain permissible range (step ST7). Block 28 of the comparator/determinator in FIG. 1 conceptually shows the comparison and determination operations in step ST6 and ST7. If the difference, i.e. the result of the comparison, falls within the permissible range, the use of the software is authorized (step ST8). For example, the execution of the program (the installation program or the startup program) is allowed to continue. If the difference is not within the permissible range, the use of the software is inhibited (not authorized or permitted) (step ST2). For example, a message saying that the authorization has been refused is displayed on the computer display, and the program (the installation program or the startup program) is terminated.

If, for example, there has been no change in the file system information of the user's computer since the user registration (i.e. since the generation of the key data), the "original" and "current" file system information is identical, which means that the user's current computer is obviously identical, with some exceptions described earlier, to the computer associated with the file system information which was used as the basis for the key data generation at the time of the user registration. Therefore, the use of the software is of course permitted in this case. Such a case of the exact (or almost exact) matching occurs, for example, when the software is installed directly after the key data acquisition during the registration. On the other hand, the contents of the file system information naturally changes with the use of the user's computer. In such a case, the "original" file system information reproduced in step ST4 becomes different from the "current" file system information read in step ST5; however, if the difference between the two file system information is within the permissible range as determined in step ST7, the identity of the user's computer is recognized because of the strong similarity between the two file system information, and the use of the software is permitted. Let it be assumed here that the permissible range is set, in advance, in the protection program by the licenser on his or her own responsibility.

In case the software is going to be unfairly installed or started running on a computer other than the computer authorized at the time of the user registration (i.e. other than the computer whose file system information was used as a basis for generating the key data), and even if the valid key data for the authorized computer is successfully acquired for the unfair use, the "current" file system information read in step ST5 obviously differs from the file system information reproduced on the basis of the valid key data, except in the exceptional cases described earlier; this is because the "current" file system information read in step ST5 is one for the unauthorized other computer. Therefore, the use of the software can be reliably prohibited, through step ST7 judging that there is not sufficient similarity between the two file system information or that their difference is outside the permissible range. Thus, as long as the permissible range, the criteria of the judgement, has been appropriately set, the unfair use of the software can be prevented effectively.

Figure 6:
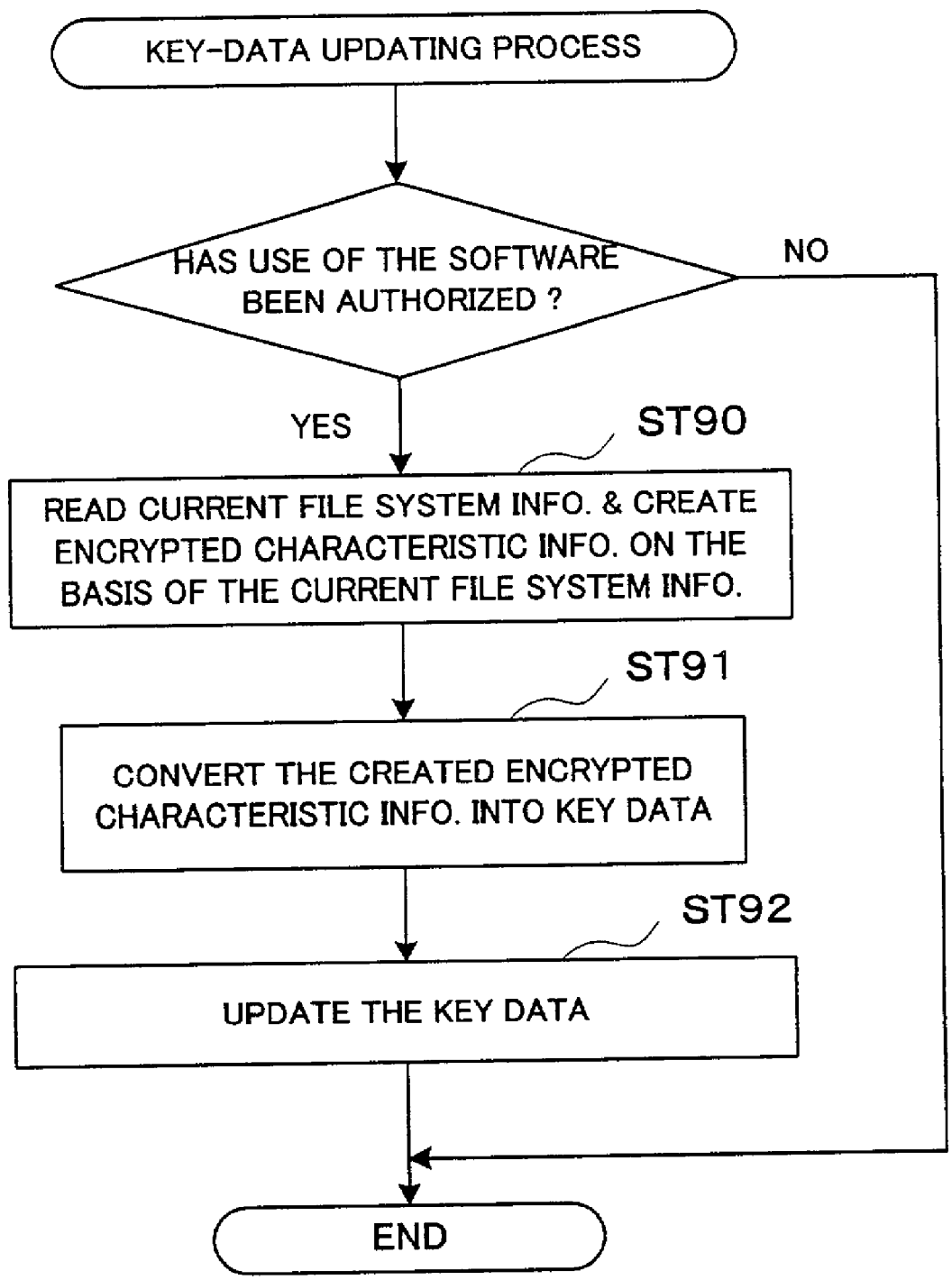
FIG. 6 is a flowchart showing an exemplary step sequence of a key data updating process.

Note that even in the case of the authorized computer, its file system information will change sequentially at a relatively rapid rate with sequentially-repeated use of the computer. Therefore, without any appropriate measures taken, the difference between the "original" file system information (at the time of the user registration) and the "current" file system information could become too great beyond the permissible range so that the two file system information is inevitably judged to be dissimilar to each other. To cope with this problem, it is effective to update the contents of the key data to adaptively match the "current" file system information. For this purpose, in step ST9, the key data is adaptively updated on the condition that the determination as to the availability of the software has been duly made. Namely, the contents of the key data are updated to match with the "current" file system information read in step ST5. Block 29 of the adapter in FIG. 1 conceptually shows this updating process in step ST9. FIG. 6 is a flow chart showing an example operational sequence of the key data updating process of key data. Step ST90 is performed on the condition that the determination as to the availability of the software has been determined, and the encrypted characteristic information is generated based on the "current" file system information. The encryption here uses the same algorithm as the encryption algorithm used in step S1 of FIG. 3. The encrypted characteristic information is then converted to key data in step ST91. For this conversion, the same conversion algorithm as the one used on the licenser's side in step S3 in FIG. 3 can be used. Then, the old (or original) key data preserved in the user's computer is updated with or replaced with this newly generated key data (step ST92). In case that the use of the computer is not authorized, the update of the key data by step ST90 to step ST92 is not performed. Note that, in step ST90, the "current" file system information read in the previous step ST5 may be used just as it is, or the "current" file system information may be newly read. In a case where this key data updating process is carried out at any desired time point within the software as described later, the "current" file system information is read in step ST90, and the encrypted characteristic information is generated based on the thus-read "current" file system information.

It is desirable that the key data updating process be performed as frequently as possible, in order to keep the contents of key data appropriately updated. In the case where the protection program is designed to be executed at the startup of the software, the key data updating process can be performed every time the software is started running, as long as the key data updating process is incorporated in the protection program as step ST9. In such a case, the key data updating process can be performed with a relatively sufficient frequency, as long as the software is of a frequently-used type. However if the software is not of a frequently-used type, the old characteristic information (or file system information) corresponding to the key data could become quite different from the current characteristic information (or file system information), and thus even a duly registered user could be misjudged to be an unfair user; this is because the key data updating process is carried out an insufficient number of times and consequently the file system could change greatly while the software is not used with the key data remaining unchanged. On the other hand, where the protection program is designed to be executed only at the time of installation of the software, and if no other appropriate measures are taken than incorporating the key data updating process in the protection program as step ST9, the key data updating process would be executed only an insufficient number of times.

To provide a solution to the above-discussed problem, i.e. the insufficient execution of the key data updating process, the key data updating process of FIG. 6 may be executed each time the OS is started up on the computer, or at certain time intervals, or at any other desirable time point. In that case, the most recent result of the determination as to the availability of the software may be stored in the user's computer, and the key-data updating process of step ST90 to step ST92 may be performed on the condition that the most recent result of the determination stored in the user's computer indicates "authorizable". Specifically, it suffices to just add the program for performing the key data updating process to a listing of programs that are automatically executed at the startup of the computer. For example, with the Windows (trademark of Microsoft Corporation), previously registering the program as a startup program is sufficient for that purpose.

With the unfair-use preventing method of the present invention, an unauthorized or unfair user in some case might be misidentified as an authorized user, if the above-mentioned permissible range for the authorization is set too wide. Conversely, if the permissible range is set too narrow, the likelihood of an authorized user being misidentified as an unfair user will increase when the file systems of his or her computer is subjected to a rapid change. Further, in some case, the licenser may provide a service for reissuing the key data for any registered user who has lost the key data, in which case it may not be impossible at all for a malicious user to require reissuance of the key data improperly using the key data reissuance service and using the file system information of an unauthorized computer so that a plurality of computers can use the software unfairly. Thus, as may be obvious from such possibilities as noted above, the unfair-use preventing method of the present invention does not necessarily intend to provide a complete or perfect solution for preventing the unfair use of the software. Accordingly, it is necessary for the licenser to set the permissible range or threshold values for the authorization of the use of the software on his or her own responsibility, in order to effectively practice the method of the present invention.

In spite of the several limitations or inconveniences as described above, the method of the present invention has remarkable effects for preventing the unfair use, as compared with the conventionally-known unfair-use preventing methods that are based on the use of readily copyable passwords. For example, with the conventionally-known unfair-use preventing methods based on the use of the password, it is possible to transmit the password, verbally or via an e-mail, to any other interested person unfairly without being detected by others, and the password can spread easily among many people.

By contrast, according to the unfair-use preventing method of the present invention, in the event that an unfair user tries to manipulate the file system of his or her computer with a view to leading the protection program to the misidentification, the unfair user must first detect or analyze the file system structure corresponding to the key data (e.g. by decrypting the key data) and then greatly change the file system of his or her computer to match the detected structure. Therefore, the unfair user would have to consume so great time and labor, and thus the unfair use can never be a profitable attempt, if possible at all, especially when many days of work is needed to decrypt strongly encrypted key data. In addition, when unfairly requesting the reissuance of key data by e-mail, there is a relatively high psychological deterrent because the licenser would know who request it, and thus any unfair user would be detected if the request for the key data reissuance is repeated too frequently. For various reasons including the above-mentioned, it is believed that the present invention allows the possibility of the unfair copying of the software spreading widely to be significantly reduced, as compared with the conventional unfair-use preventing methods based on the use of passwords.

As described above, if the permissible range is set appropriately by the licenser, the present invention can effectively prevent the unfair use of the software, because any interested user is not allowed to use the software on his or her computer unless the interested user first sends the licenser the encrypted characteristic information of the computer where the software is to be used and then receive valid key data. Further, with the present invention, even an authorized user can not install the same software in another computer having different characteristic information from that of the principal computer of the user. Therefore, the present invention has remarkable effects for preventing the unfair use of the software.

It should also be appreciated that the protection program in accordance with the present invention may be executed not only at the time of installation or startup of the software but also at each time when the user tries to copy the software, in order to prevent the unfair copying on such occasions. Alternatively, the protection program may be executed only at the installation time, and the installation process may be carried out directly after the reception of the key data, in which case the key data updating process (see step ST9 of FIG. 6) may be omitted.

Note that in the illustrated example of FIG. 1, two characteristic information (i.e. information in the decrypted form) based on the file system information are compared at block 28 of the comparator/determinator. Alternatively, the determination as to the availability of the software may be performed by comparing the previously saved key data and other key data which is generated by encrypting and converting detected "current" file system information (i.e. data in the encrypted form). But, this approach is not so preferable, because it is more subject to alteration of the key data by an unfair user. Thus, it is preferable to compare the characteristic information based on the file system information (i.e. comparison between information in the decrypted form), as described above in relation to the preferred embodiment. However, it should be understood that the alternative embodiment where the comparison is performed between the key data is also embraced in the inventive technical idea of authorizing the use of the software based on the features of the file system, and therefore the alternative embodiment falls within the scope of the present invention, although it has a certain disadvantage.

The software might be unfairly used or unfairly copied by being analyzed and modified (e.g. by reverse engineering), even where the software is protected by the above-described function of determining the availability of the software. This could be done by unfairly modifying the software to thereby invalidate the availability determining function incorporated in the software. Particularly, in the case where the availability determining function is performed only at the time of installation or startup of the software, there is a more likelihood of the software being unfairly used by modification of only that small part of the software. To cope with this threat of software modification, it is effective to place the availability determining function at a plurality of points within the software for determining the availability of the software repeatedly at different points. Because, such unfair use can be prevented by causing the use of the software to be inhibited when the use is rejected at one location within in the software where no modification has been made, even if the use is authorized at other locations within the software where unfair modifications have been made. To compare the availability determining function to a mine (a type of bomb hidden below the ground), the situation described above is very similar to the fact that laying many mines widely in and around a particular field can make enemy's attack much harder than laying only one mine at the entrance of the field. Specifically, it is more advantageous to call out the protection program, such as the one shown in FIG. 5, at any desired one or more locations within the software (i.e. one or more time points in the execution steps of the software), in order to execute the unfair-use preventing processing in accordance with the present invention. Alternatively, the routine of the protection program shown in FIG. 5 may be carried out only once during the execution of the software (e.g. at the startup of the software), and then the determination of at least step ST7 in FIG. 5 may be carried out at any one or more locations within the software.

Note that, if necessary, the present invention can be implemented in the form of a dedicated hardware device, namely the device for preventing the unfair use of software, and the same effects and benefits of the present invention as described above can be achieved by the dedicated hardware device too. Thus, such an embodiment where the unfair-use preventing method of the present invention is implemented by the dedicated hardware device is also within the scope of the present invention.

According to the present invention having been described so far, the file system information of a user's computer using particular software is utilized as unique characteristic information of the computer, and then key data specific to that computer is generated based on the file system information. When another user desires to use the software on his or her computer, an evaluation is performed, using the key data, on the file system information of the other user's computer, to thereby determine whether or not permission for using the software can be given to the other user's computer. With such arrangements, the present invention accomplishes various superior benefits as follows. Namely, the present invention can effectively prevent unfair use of the software completely on a software basis, and is well suited for protecting software that is distributed online via a communication network. Further, the present invention does not require hardware keys, and can eliminate a need for supplying the software in the form of a particular transportable recording medium., so that the present invention can be practiced at low costs. Further, the present invention can also eliminate a need for the software supplier to create the software for each operating system. Furthermore, because the present invention is free of restrictions by the operating system, it is also applicable to software of the so-called "cross-platform" type.

What is claimed is:

1. A method for preventing unfair use of software, comprising:
    a first step of detecting a feature of a file system of a computer of a particular user and generating characteristic information based on the detected feature;
    a second step of causing a licenser of software to generate key data on the basis of the characteristic information generated by said first step, and providing the particular user with the key data;
    a third step of detecting a feature of a file system of a particular computer when the software is to be used on said particular computer, and generating characteristic information on the basis of the feature detected by said third step;
    a fourth step of performing an authorization test for determining whether or not to permit use of the software by said particular computer, on the basis of presence/absence of identity or similarity between the characteristic information based on the file system corresponding to the key data and the characteristic information generated by said third step;
    a fifth step of storing the key data provided to the user by said second step; and
    a sixth step of updating the key data, stored by said step of storing, so as to match the characteristic information generated by said third step at least with the provision that said fourth step has determined the use of the software should be permitted.

2. A method as claimed in claim 1, further comprising the a step of reproducing, from the key data provided to the user, the characteristic information generated by said first step on the basis of the detected feature of the file system, and
    wherein said fourth step compares the characteristic information reproduced from the key data and the characteristic information generated by said third step, and determines whether or not to permit the use of the software on the basis of presence/absence of identity or similarity between the characteristic information compared.

3. A method as claimed in claim 2, wherein said second step converts the characteristic information generated by said first step into the key data in accordance with a predetermined conversion algorithm, and wherein said step of reproducing reproduces, from the key data, the characteristic information generated by said first step, by reverse execution of the predetermined conversion algorithm.

4. A method as claimed in claim 1, wherein the feature of the file system is detected by reading file system information of the computer.

5. A method as claimed in claim 1, wherein said fourth step calculates a difference between the characteristic information based on the file system corresponding to the key data and the characteristic information generated by said third step, and said fourth step determines whether or not to permit the use of the software on the basis of a calculated level of the difference.

6. A method as claimed in claim 1, wherein said fourth step is executed at least one of time points when the software is installed into the computer, when the software is started to run on the computer and when the software is to be copied on the computer, and the use of the software is inhibited when said fourth step has determined that the use of the software should not be permitted.

7. A method as claimed in claim 1, wherein said fourth step is executed at desired one or more time points during use, by the computer, of the software, and wherein the use of the software is inhibited when said fourth step has determined, at any one of the time points, that the use of the software should not be permitted.

8. A storage device storing a computer program comprising computer program codes for performing all the steps of claim 1 when said program is run on a computer.

9. A storage device storing a computer program comprising computer program codes for performing all the steps of claim 7 when said program is run on a computer.

10. A storage device storing a computer program for causing a computer to perform a method for preventing unfair use of computer software, said computer program comprising:

a first step of detecting a feature of a file system of a computer of a particular user and outputting characteristic information based on the detected feature, the characteristic information based on the detected feature being sent to a licenser of the software so that the licenser is allowed to generate key data corresponding to the characteristic information;

a second step of receiving the key data generated by the licenser;

a third step of detecting a feature of a file system of a particular computer when the software is to be used on said particular computer, and generating characteristic information on the basis of the detected feature;

a fourth step of performing an authorization test for determining whether or not to permit use of the software by said particular computer, on the basis of presence/absence of identity or similarity between the characteristic information based on the file system corresponding to the key data and the characteristic information generated by said third step;

a fifth step of storing the key data provided to the user by said second step; and a sixth step of updating, the key data, stored by said step of storing, so as to match the characteristic information generated by said third step, at least with the provision that said fourth step has determined the use of the software should be permitted.

11. A storage device storing a computer program as claimed in claim 10, wherein said first step sends the licenser of the software the characteristic information, output by said first step on the basis of the detected feature, via a communication network, and said second step receives the key data, generated by the licenser, via the communication network.

12. A storage device storing a computer program as claimed in claim 10, wherein at least said fourth step is executed at one or more locations within the software, and wherein the use of the software is inhibited when said fourth step has determined, at any one of the location within the software, that the use of the software should not be permitted.

13. A storage device storing a computer program as claimed in claim 10, wherein said computer program comprises a user registration program and a protection program, said first and second steps are included in said user registration program, and said third, fourth, fifth, and sixth steps are included in said protection program.

14. An apparatus for preventing unfair use of software, comprising:

first detection means for detecting a feature of a file system of a computer of a particular user and generating characteristic information based on the detected feature;

generation means for causing a licenser of software to generate key data on the basis of the characteristic information generated by said first detection means, and providing the user with the key data;

second detection means for detecting a feature of a file system of a particular computer when the software is to be used on said particular computer, and generating characteristic information on the basis of the detected feature;

authorization means for performing an authorization test for determining whether or not to permit use of the software by said particular computer, on the basis of presence/absence of identity or similarity between the characteristic information based on the file system corresponding to the key data and the characteristic information generated by said second detection means;

storage means for storing the key data provided to the user by said generation means; and update means for updating the key data, stored by said storage means, so as to match the characteristic information generated by said second detection means, at least with the provision that said authorization means has determined the use of the software should be permitted.

* * * * *